A. F. DICKEY.
TRANSMISSION GEARING.
APPLICATION FILED JULY 3, 1911.

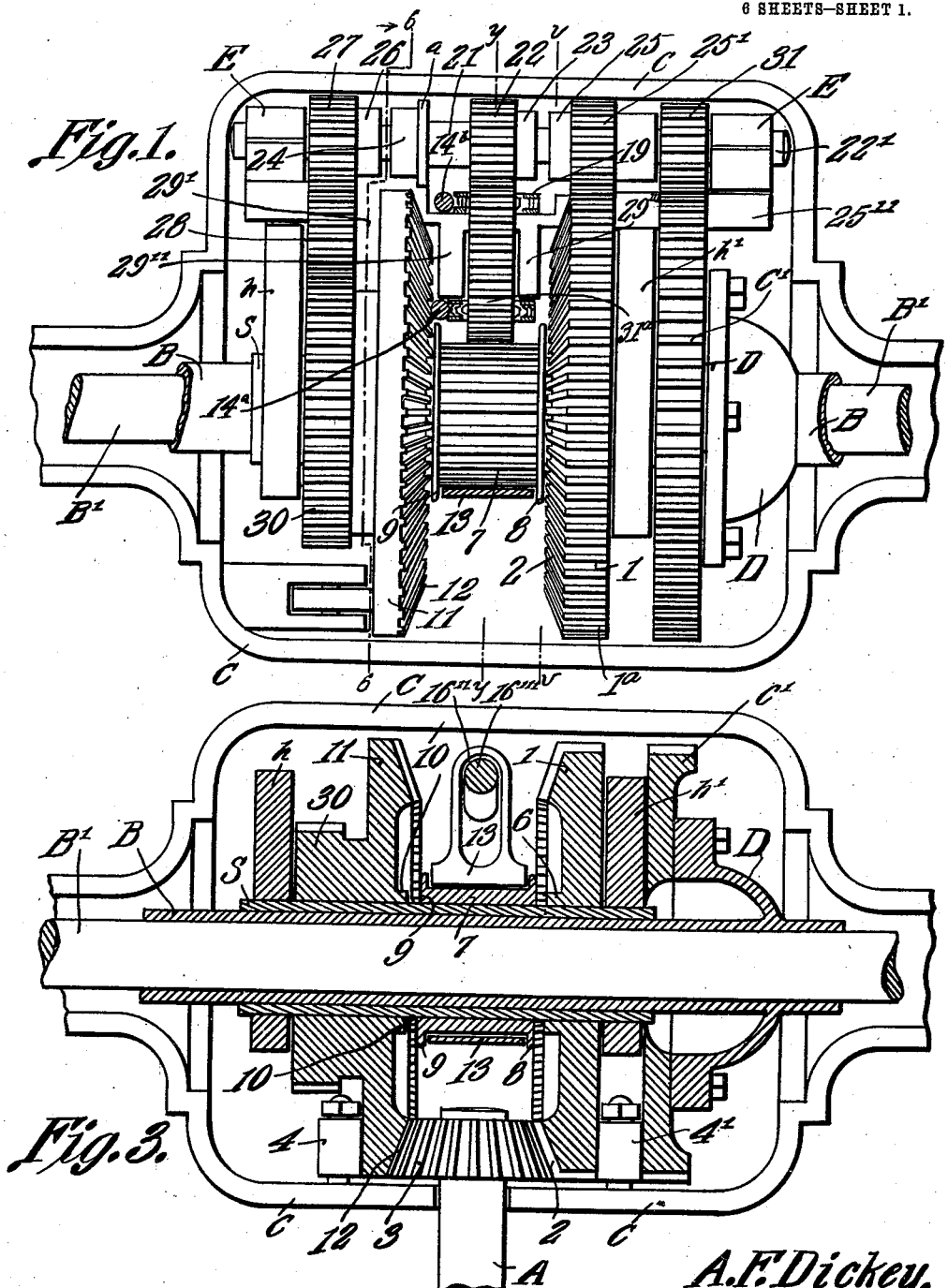

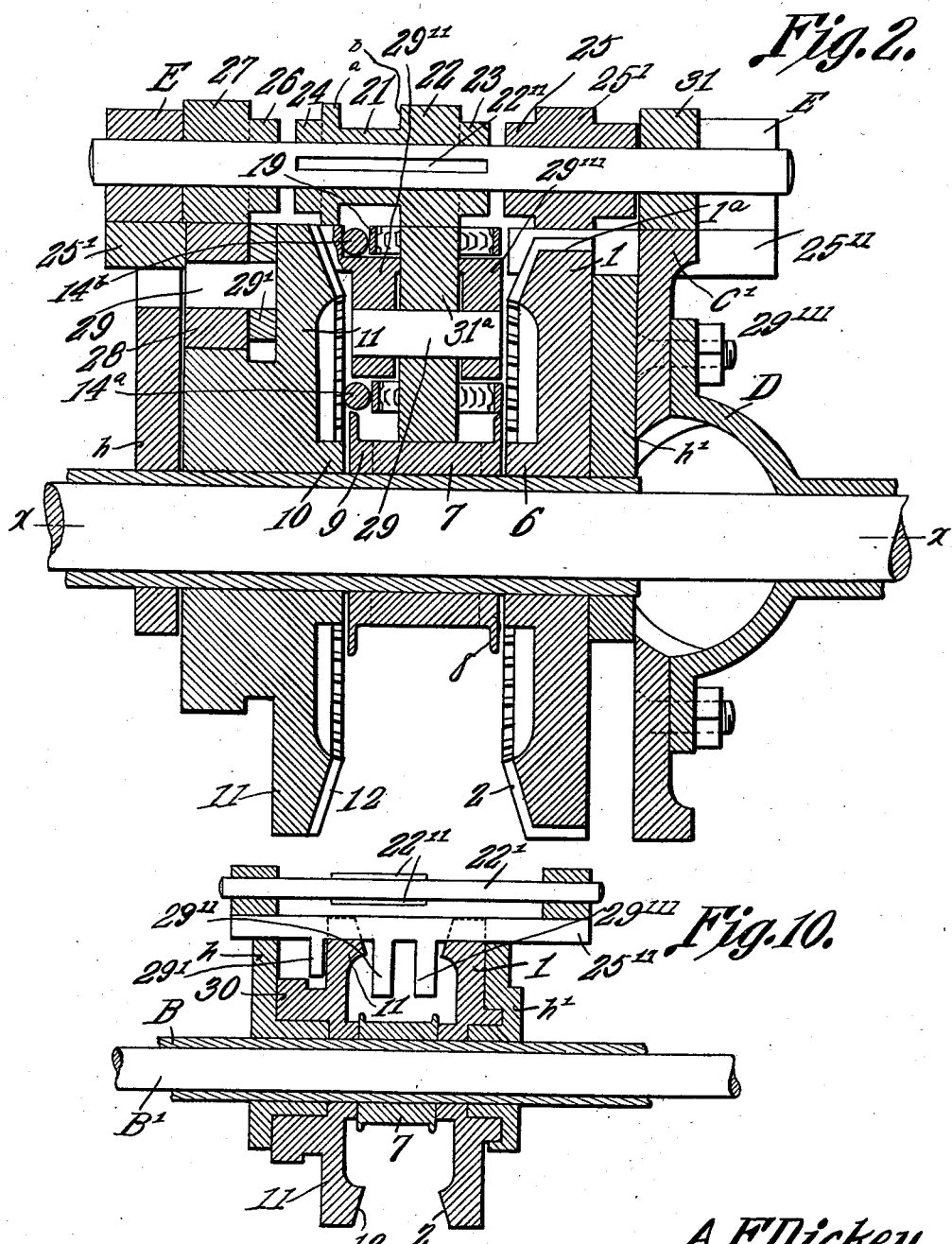

1,029,109.

Patented June 11, 1912.
6 SHEETS—SHEET 3.

Witnesses

A. F. Dickey,
Inventor by C. A. Snow & Co.
Attorneys

A. F. DICKEY.
TRANSMISSION GEARING.
APPLICATION FILED JULY 3, 1911.

1,029,109.

Patented June 11, 1912.

6 SHEETS—SHEET 4.

Witnesses

A. F. Dickey,
Inventor by C. A. Snow & Co.
Attorneys

A. F. DICKEY.
TRANSMISSION GEARING.
APPLICATION FILED JULY 3, 1911.

1,029,109.

Patented June 11, 1912.

6 SHEETS—SHEET 5.

A. F. Dickey,
Inventor

A. F. DICKEY.
TRANSMISSION GEARING.
APPLICATION FILED JULY 3, 1911.
1,029,109.
Patented June 11, 1912.
6 SHEETS—SHEET 6.
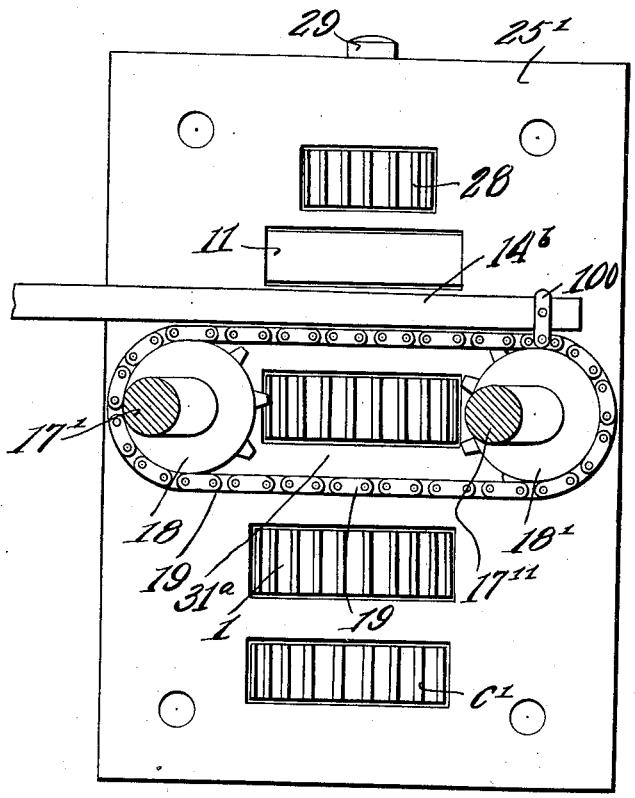
*Fig. 7.*
*Fig. 9.*
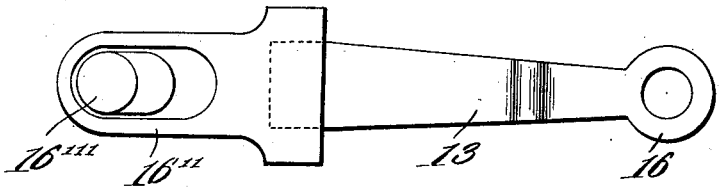
Witnesses
A. F. Dickey
Inventor
by C. A. Snow & Co.
Attorneys

UNITED STATES PATENT OFFICE.

AARON F. DICKEY, OF SOMERSET, PENNSYLVANIA.

TRANSMISSION-GEARING.

1,029,109.

Specification of Letters Patent.   Patented June 11, 1912.

Application filed July 3, 1911.   Serial No. 636,802.

*To all whom it may concern:*

Be it known that I, AARON F. DICKEY, a citizen of the United States, residing at Somerset, in the county of Somerset and State of Pennsylvania, have invented a new and useful Transmission-Gearing, of which the following is a specification.

This invention relates to an improvement in transmission gearing, the primary object of the invention being the provision of a forward and a reverse gearing mechanism adapted to be interposed between a source of motor power and the shaft or axle to be driven and provided with means for making said change.

A further object of this invention is the provision of a variable speed transmission gearing adapted to be operably connected between a driving and driven shaft, with two sets of clutches, one of said clutches being adapted to be operated before the other.

A further object of the invention is the provision of a novel form of shifting device for the clutches of the transmission gearing.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 4:
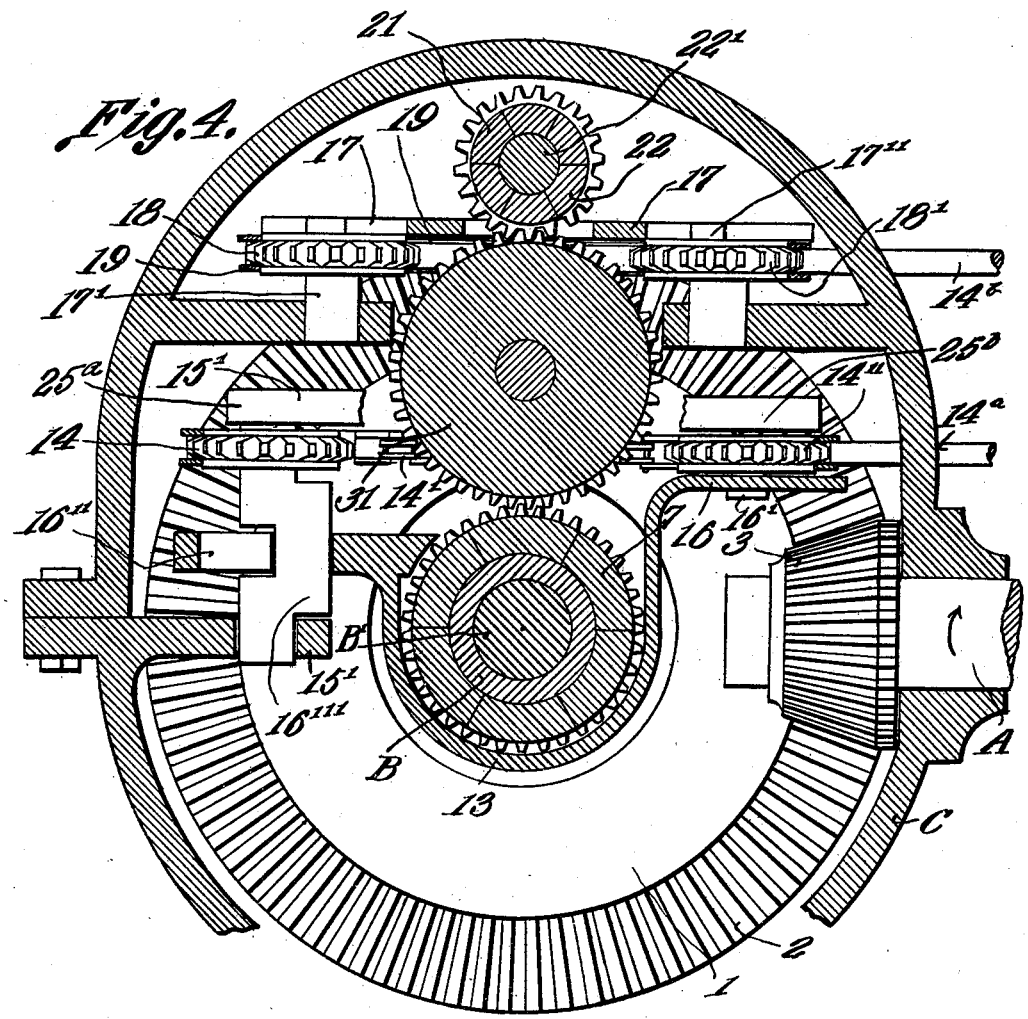
Figure 5:
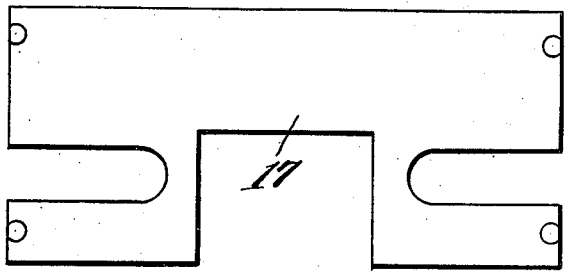
Figure 5:
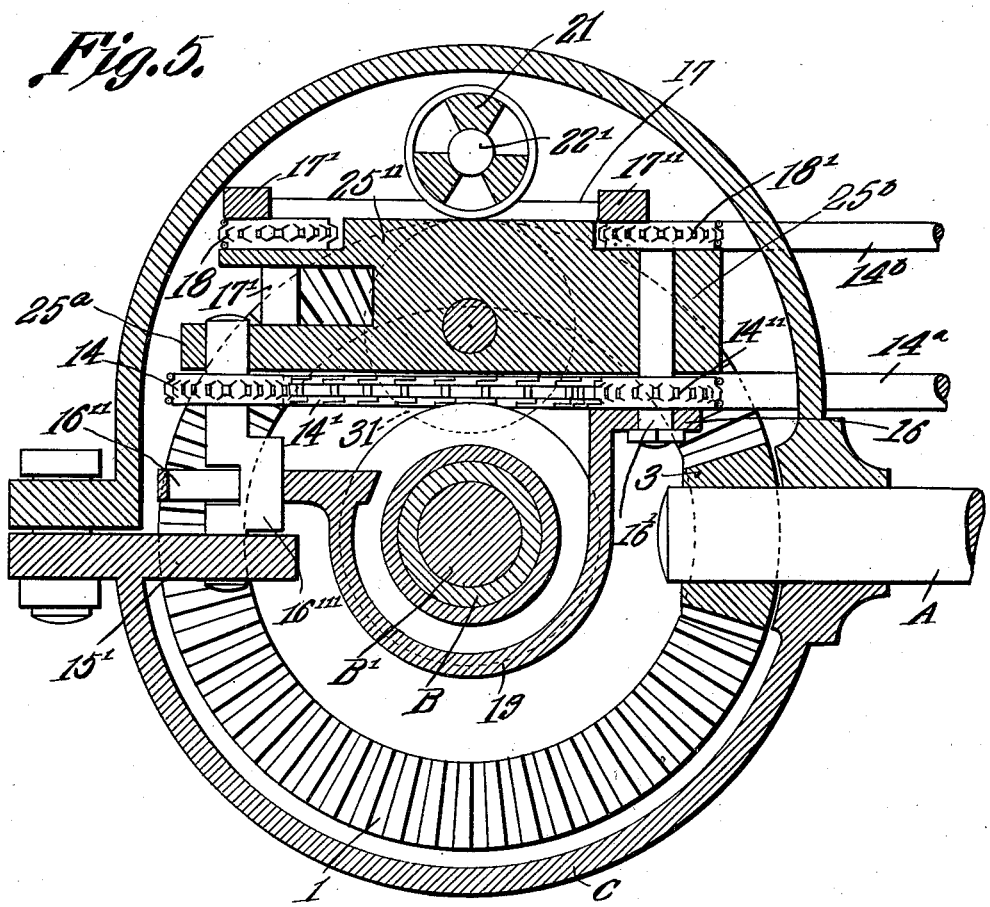
Figure 11:
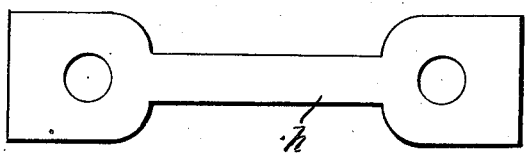
Figure 6:
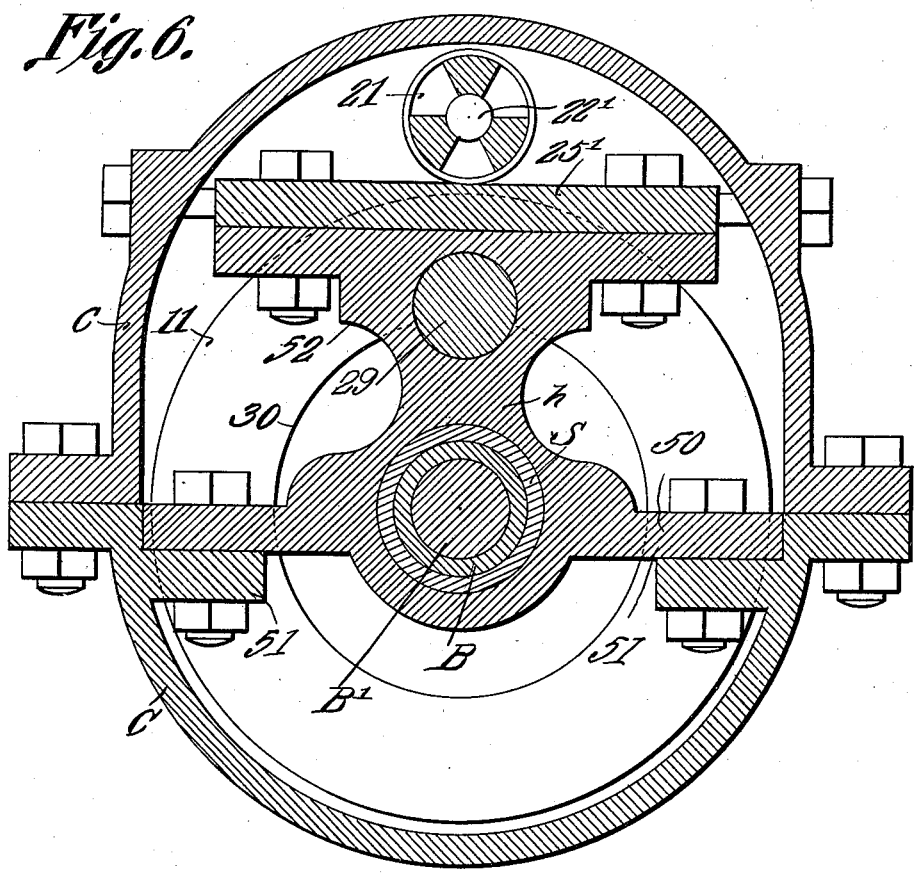
Figure 12:
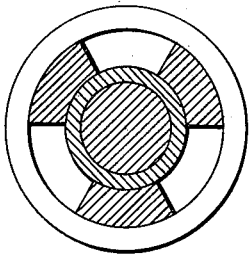

In the drawings:—Figure 1 is a plan of the transmission mechanism assembled in casing. Fig. 2 is a vertical sectional view through the rear shaft of an automobile with a transmission gearing operably connected therewith. Fig. 3 is a section taken on line X—X of Fig. 2. Fig. 4 is a section taken on line Y—Y of Fig. 1. Fig. 5 is a section on line V—V of Fig. 1. Fig. 6 is a sectional view on line 6—6 Fig. 1, illustrating the supporting frames mounted within the transmission casing. Fig. 7 is a top plan view of the upper end of the frame supporting the upper clutch plate.
Fig. 8 is a plan of the shift plate of said upper clutch. Fig. 9 is a top plan view of the lower clutch lever. Fig. 10 is a detail sectional view with all small gears removed the journaling for the large gears being slightly modified. Fig. 11 is a detail view of the upper ends of the main frame carried in the casing. Fig. 12 is a detail sectional view showing the main clutch spool in operable position.

Referring to the drawings, the letter A designates the main or driving shaft connected to the engine (not shown) and B designates the rotatable sleeve around the rear axle B′ of an automobile. Engaging the sleeve B within the differential gear casing C is a cap or spider D, which is rotated, through the large gear C′, which receives its motion from the gear 31.

Loosely mounted upon the sleeve S surrounding sleeve B are the two large gears 1 and 11, both having bevel teeth and peripheral teeth. The gear 11 has attached thereto or formed integral therewith a gear 30. The gear 1 is the high speed forward and reverse gear of the transmission mechanism and has a bevel gear 2, meshing with the pinion 3, and the gear 11 with gear 30 is the low and intermediate speed forward gear and has its bevel gear teeth 12 meshing at all times with the bevel pinion or gear 3. Slidably and rotatably mounted upon the sleeve B, between the two gears 1 and 11, is the main clutch or geared spool 7. As above stated, the two gears 1 and 11 have the small pinion 3 meshing at all times with them, and as the said gears 1 and 11 are rotatably mounted on the sleeve B, they simultaneously rotate freely upon the sleeve B, or on a bearing surrounding the sleeve B. The anti-frictional bearings 4 and 4′ supported by the walls of the casing C provide anti-frictional means and limit the outward thrust of the gears 1 and 11.

The sleeves S and B are held within the casing C by means of the frames h—h′, Fig. 6, by means of the lugs 50 and 51, of said frames h—h′, and the casing. The upper ends 52, of said frames h—h′ have attached thereto the journal boxes E, in which is mounted the main transmission shaft 22′, which carries therewith, as it is keyed thereon, the small gear 31, which as before stated is in mesh at all times with the large gear C′. Thus it will be seen that to drive the gear C′ and sleeve B, that motion must be transmitted from shaft A and pinion 3 to said shaft 22′ and gear 31, and to accomplish this, several methods are herein provided.

Rotatable freely upon the shaft 22′, so as to have its teeth meshing with the peripheral teeth of the gear 1 at all times is a gear 25′, having a clutch face 25, opposed to the clutch face 23 of the slidable pinion 22, which is keyed by means of the key 22'', to the shaft 22', so as to be moved to right or left as viewed in Figs. 1, 2 and 10, its reduced portion 21, with peripheral rims or shoulders *a* and *b* providing a means whereby the clutch operating plate or frame 17 may operate said pinion 22 and its portion 21, to cause the clutch face 23 to engage the clutch face 25 of the gear 25', or be moved in the opposite direction to cause the clutch face 24 of the portion 21, to engage the clutch face 26, of the small gear 27 which is freely rotatable upon the shaft 22', above and in mesh with the small intermediate gear 28, journaled on the stud 29 of the arm 29' of the frame 25''. This gear 28, is in mesh at all times with the gear 30 of the large gear 11, so that the rotation of the gear 11, through pinion 3 and bevel teeth 12, will rotate gear 30, and consequently gears 28 and 27, which as the clutch faces 26 and 24 are together will cause the shaft 22' and gear 31, to transmit motion to the gear C', the cap D and sleeve B, to the wheels of an automobile.

The gears 1 and 11 are provided upon opposed faces of their respective hubs with the clutch faces 6 and 10, which are opposed to co-act one at a time with the clutch faces 8 and 9 of the geared spool or main clutch member 7. The teeth of the geared spool or clutch member 7 are at all times in mesh with the large gear 31ª, journaled upon the short shaft 29ˣ, carried in the lugs 29'', of the plate or frame 25'', said gear 31ª, being in mesh at all times with the gear 22, rotatable with but slidable upon the main driven shaft 22' as above set forth.

It will be seen that normally the shaft A, pinion 3, gears 1, 11, and 30, and small gears 28, 27, and 25', are rotating, but that in view of the fact that gear 22 is not rotating that the shaft 22', gear 31 and main gear C' are not affected, but in order to set forth particularly the various uses of the transmission clutches of the gear 22, and geared spool F, it will be best understood by taking them in the rotation of the various speeds beginning with a reverse movement of the gear C'.

In order to produce a reversal of the movement of the driven sleeve B, the clutch member 7 is moved so that its clutch portion 8 will engage the clutch portion 6 of the gear 1, thus causing motion to be conveyed to the main transmission shaft 22', through the geared spool 7, and the gear 31ª, the shaft 22' being rotated by the gear 22 and thereby rotating the gear 31 and finally the main gear C' to impart to the sleeve B a reverse movement. To drive the gear 11 at a low "forward" speed the clutch member 7 is moved in the opposite direction or until the clutch face 9 of the gear 7 engages the clutch face 10 of the gear 11, at which time the driving shaft A will convey motion to the sleeve B through the pinion 3, bevel gear portion 12 of the gear 11, clutch faces 10 and 9 to the gear 7, gear 31ª, gear 22, shaft 22', gear 31, large gear C' to the sleeve B.

In order to provide the proper movement of the sliding and rotatable geared spool 7, the oscillating frame 13 is employed, the forward end 16 thereof being pivoted at 16', while its free end 16'' is mounted upon the crank of the vertically journaled short shaft 16''', whose upper end is eccentrically connected to the sprocket wheel 14. The shaft 16''' is supported between the arm or bracket 15', carried by the casing C and the arm 25ª of the frame 25''. The sprocket 14 is connected by chain 14', with sprocket wheel 14'', journaled upon the pin 16', carried in the end 25ᵇ of frame 25'', and as the operating rod 14ª is connected by pin 100 to the chain 14', it will be seen that the movements of this rod will cause the sprockets 14 and 14'' and the crank 16''' to be rotated and move the frame 13 and clutch spool 7, in the desired direction to be placed in operation relatively with the gear 1 (reverse speed) or the gear 11 (low speed).

In order to obtain what is termed a high and second speed, the gear 11 is employed, and the sliding and oscillating frame 17, which is operated similarly to the frame 13 is preferably employed. This frame 17 (Fig. 8), is provided with the forwardly extending rod 14ᵇ, which may be connected to the operating rod 14ª, (not shown) of the frame 13 so that it can be operated in turn with said frame 13. This frame 17 is connected with an eccentrically disposed shifting stud 17', operated by sprockets 18 and 18'', through chain 19, Figs. 4, 5, 7 and 8, the mechanism being similar to the construction of the clutch operating mechanism for clutch spool 7 but superposed thereabove. This frame 17 abuts exteriorly with the spool rim *a* and a shoulder *b* of the upper clutch 21, which as before stated is slidably mounted upon the shaft 22' by means of the key and slot 22''. This clutch member 21 is provided with a clutch at each end, upon one end is the clutch face 23 and upon the other end the clutch face 24, the said clutch face 23 being adapted to be slid into engagement with clutch face 25, of the pinion 25' producing high speed, while the clutch face 24 is adapted to be slid into engagement with the clutch face 26 of the intermediate speed gear 27, producing intermediate speed. To bring the clutch spool 7 now to neutral and out of engagement with both clutch faces 6 and 10, the rod 14ª, is moved forwardly so as to cause the sprockets 14 and 14'' to be rotated one quarter of a revolution, thus oscillating the frame 13 and the clutch member 7, so that the clutch members thereof are out of contact with the clutch faces of the gears 1 and 11. To move from neutral to low speed, the frame 13 is moved a distance equal to a quarter of a revolution of one of its sprocket wheels 14 or 14″, this action moving the clutch spool 7 so that its clutch face 9 will engage the clutch face 10 of the gear 11, thus giving a low speed forward movement from the driving shaft A through the gear 3, beveled gear 11, clutch faces 9 and 10 and the clutch spool 7, gear 31′, gear 22, shaft 22′, gear 31, large gear C′ and sleeve B. To change now to the second speed, the frame 13 is moved by the sprockets 14 and 14″ to throw the clutch member 7 out of engagement or at neutral, Fig. 2. The rod 14^b is now moved to cause the sprockets 18 and 18′ to move or oscillate the frame 17, and thereby the clutch member 21 so that the clutch faces 24 thereof will engage the clutch face of the gear 27. Motion will now be transmitted from the shaft A and pinion 3, through the gear 11, the gear 30, the gear 28, the gear 27, the clutch faces 26—24, gear 22, the shaft 22′, the gear 31, the large gear C′ and the driven sleeve B. This is the intermediate speed. To move from intermediate speed to high speed, the frame 17 is moved oppositely bringing the clutch faces 23 of member 21 into engagement with the clutch 25 of the gear 25′. This gear 25′ is a high speed gear and transmits motion directly from the driving shaft A through teeth 1^a of the gear 1, gear 25′, gear 22, shaft 22′, gear 31, large gear C′ to the driven sleeve B, the gear 22, rotating the gear 31^a and spool 7, which are free at this time, the clutch faces of spool 7 and gears 1 and 11 being at neutral. It will thus be seen that motion is transmitted from the shaft 22′ to the gears 31 and C′, from either of the gears 1 or 11, through the various clutches 7 or 21, and that various speeds are imparted to the shaft 22′, from the shaft A and gears 1 and 11.

What is claimed is:—

1. The combination with a driving shaft and a driven shaft, of a variable and reversed speed transmission gearing interposed therebetween, and having a transmission shaft disposed to be operably connected with the driving shaft, two main gears rotatably mounted upon the driven shaft with opposed bevel gears operably connected at all times with the driving shaft, and means mounted upon and operably connected with the transmission shaft, whereby one of the main gears operates the transmission shaft at high and reverse speed and the other gear operates the transmission shaft at intermediate and low speed.

2. The combination with a driving shaft and a driven shaft, of a variable and reversed speed transmission gearing interposed therebetween, and having a transmission shaft disposed to be operably connected with the driving shaft, two main gears rotatably mounted upon the driven shaft with opposed bevel gears operably connected at all times with the driving shaft, a slidably and rotatably mounted geared clutch member mounted upon the driven shaft between the main gears, a slidably mounted geared clutch member keyed to the transmission shaft, two clutch members to coöperate one at a time therewith rotatably mounted upon said transmission shaft, a gear interposed between the geared portions of both clutch members, and means for throwing the geared clutch member of the driven shaft into operable relation with either main gear to rotate the transmission shaft and driven shaft from either main gear.

3. The combination with a driving shaft and a driven shaft, of a variable and reversed speed transmission gearing interposed therebetween, and having a transmission shaft disposed to be operably connected with the driving shaft, two main gears rotatably mounted upon the driven shaft with opposed bevel gears operably connected at all times with the driving shaft, a slidably and rotatably mounted geared clutch member mounted upon the driving shaft between the main gears, slidably mounted geared clutch members keyed to the transmission shaft, a gear interposed between the geared portions of said clutch members, means for throwing the geared clutch member of the driven shaft into co-acting relation with either main gear to rotate the transmission shaft and driven shaft from either main gear, two gears rotatably mounted at opposite ends of the transmission shaft, one of said gears being in mesh with one of the main gears at all times, each one of said two gears having clutch faces opposed to the geared clutch member of the transmission shaft, a gear of lesser diameter than the main gear carried by the other main gear, a small gear interposed therebetween and the other of the two loose gears of the transmission shaft, and means for operating said geared clutch of the transmission shaft to connect either one of the loose gears with the transmission shaft to operate the driven shaft from either one of the main gears through either one of the loose gears.

In testimony that I claim the foregoing as my own, I have hereto affixed my signature in the presence of two witnesses.

AARON F. DICKEY.

Witnesses:
CHAS. F. COOK,
CLARENCE L. SHAVER.

---

Copies of this patent may be obtained for five cents each, by addressing the "Commissioner of Patents, Washington, D. C."